US008498980B2

(12) United States Patent
Cochran

(10) Patent No.: US 8,498,980 B2
(45) Date of Patent: Jul. 30, 2013

(54) CHERRY PICKING SEARCH TERMS

(76) Inventor: Nancy P. Cochran, Nyack, NY (US)

( * ) Notice: Subject to any disclaimer, the term of this patent is extended or adjusted under 35 U.S.C. 154(b) by 359 days.

(21) Appl. No.: 11/702,509

(22) Filed: Feb. 6, 2007

(65) Prior Publication Data

US 2008/0189264 A1    Aug. 7, 2008

(51) Int. Cl.
*G06F 7/00* (2006.01)
(52) U.S. Cl.
USPC ............ 707/713; 707/714; 707/722; 709/203
(58) Field of Classification Search
USPC ......................................... 707/713, 714, 722
See application file for complete search history.

(56) References Cited

U.S. PATENT DOCUMENTS

| | | | |
|---|---|---|---|
| 5,278,980 A | 1/1994 | Pedersen et al. | |
| 7,100,123 B1 | 8/2006 | Todd et al. | |
| 2003/0126235 A1* | 7/2003 | Chandrasekar et al. | 709/220 |
| 2005/0144251 A1* | 6/2005 | Slate | 709/215 |
| 2006/0074891 A1* | 4/2006 | Chandrasekar et al. | 707/3 |
| 2006/0184512 A1 | 8/2006 | Kohanim et al. | |
| 2006/0190436 A1* | 8/2006 | Richardson et al. | 707/3 |
| 2008/0033919 A1* | 2/2008 | Arrouye et al. | 707/3 |

OTHER PUBLICATIONS

Churchill, Christine, "Search Engine Algorithms and Research," Search Engine Watch (Apr. 2005) available at www.searchenginewatch.com/showPage?page=3496586, four pages.
Endeca, Inc., www.endeca.com, one page.
Google, www.google.com, one page.
Guo, X. S. et al., A web application using RDF/RDFS for metadata navigation, Research & Development, Thomson Legal & Registry, http://acl.ldc.upenn.edu/acl2004/nlpxml/pdf/guo-etal.pdf (2004), eight pages.
LexisNexis Academic Announces Prototype with New Interface (posted Jun. 23, 2006) available at www.econtentmag.com, two pages.
LexisNexis introduces Concordance 2007, http://www.lexisnexis.com/about/releases/0979.asp (Jul. 17, 2007), two pages.
Lian, W. et al., An Efficient and Scalable Algorithm for Clustering XML Documents by Structure, IEEE Transactions on Knowledge and Data Engineering, 16(1):82-96 (Jan. 2004), 15 pages.
Osinski, S. et al., "A Concept-Driven Algorithm for Clustering Search Results," IEEE Intelligent Systems, 20(3):48-54 (May/Jun. 2005) (Abstract only).
Osinski, S. et al., Carrot$^2$: Design of a Flexible and Efficient Web Information Retrieval Framework, Institute of Computing Sciences, Poznan, Poland. http://www.cs.put.poznan.pl/dweiss/site/publications/download/dweiss-carrot2-poster-awic2005.pdf, six pages.

(Continued)

*Primary Examiner* — Tony Mahmoudi
*Assistant Examiner* — Tuan-Khanh Phan
(74) *Attorney, Agent, or Firm* — Blank Rome LLP

(57) ABSTRACT

In an electronic presentation of information, search is made easier and more personal by identifying words, symbols or images (collectively called terms) in text and allowing users to select any of those terms to refine their search. The technology is called "cherry picking" because it allows each user to select what they judge to be the best terms among many available terms in the text, and use those terms to their own advantage. Terms in text are identified by a visual indicator such as a change in the shape of the cursor. "Stop words," words that do not change the outcome of the search, and words that meet other specific criteria are not selectable.

37 Claims, 6 Drawing Sheets

OTHER PUBLICATIONS

Siderean, Inc., www.siderean.com, one page.
Vivisimo, Inc., www.vivisimo.com, one page.
WC3 online, http://www.w3schools.com/tags/tag_a.asp, two pages.
Yahoo, www.yahoo.com, three pages.

* cited by examiner

| 58 hits will be selected | ← 421    ⌐ 431
| if you click this term. |

1. Trade secrets i~~ntellectual privacy and~~ the origins of American industrial
   p(⌐)er/ Doron S. Ben-Atar. 2004 p. cm. ISBN 030010006X (alk paper) per)
   Call Number: HD38.7 .B455 2004

⌐ 432        ⌐ 433        ⌐ 435
2. Cultural intelligence people skills for global busines/ David C. Thomas & Kerr
   Inkson. 2004 p. cm. ISBN: 1576752569
   Call Number: GN450.8 .T47 2004

⌐ 434                               ⌐ 437
3. The value factor how global leaders use information for growth and competitive
   advantage / Mark Hurd and Lars Nyberg. 2004 p. cm. ISBN 1576601579 (alk paper)
   Call Number: HF54.5. .H87 2004

⌐ 432           ⌐ 436    ⌐ 433
4. Cultural intelligence a guide to working with people from other cultures /
   Brooks Peterson. 2004 p. cm. ISBN: 1931930007
   Call Number: HM1211 .P47 2004

MILITARY ANALYSIS          Hanging Makes Hussein a Martyr to Many
A New Commander,           Saddam Hussein's public image in the Arab world has udergone a
In Step with the           resurgence of admiration. Above, demonstrations in Amman, Jordan
White House on    # hits = 47
Iraq By MICHAEL R. BOROON       Katrina Victims Find a        Companies Pay Dearly ← 532
                           Solution: Modular House      for Tech Trade Show
As a supporter of increased By LESLIE EATON              By BRAD STONE and DAMON
forces in Iraq, Lt. Gen.                                 DARLIN
548 → David H. Petraeus is  On the Gulf Coast, where
expected to back a rapid    building materials are       The Consumer Electronics ← 544
five-brigade expansion.     expensive and contrctos     Show in Las Vegas is a big
                           are scarse, so-called         opportunity for technology
530 ─────────────           modular houses could speed   companies -- at a price.
Bush Facing Deep        the slow pace of recovery.
Divide Over More                                     MORE NEWS
Troops for Iraq         San Franciscans Hurl         • Inqiry Reportedly
By DAVID E.SANGER and JEFF  Their Rage at Paking           Cites Evidence Against
ZELENY                      Patrol                       • Marines in Iraq Somalis
                           By JESSE McKINLEY              Disarnament Plan is
A call for more troops could                              Postponed as Somalis
set the stage for a major   Officials are scrambling to   Protest 8:40 AM ET
battle with Democrats over  end abuse of the officers
a new war strategy.         who andout tckets. There    • Palestinian President
                           were 28 attacks in 2006.       Says Hamas Militia Is
   ↑                                                      Illegal  12 minutes ago
  540                           542

> To Refine your Search --
> 
> 1. Pass your cursor over the text in the current set of hits.
> 
> 2. When the cursor is shaped like a hand,  , the word it is on can be clicked and selected.
> 
> > Your search will be refined to show hits containing your original search word(s) plus the word you selected.
> > 
> > The number that appears near the target word when the cursor hovered over it tells you how many hits will be selected.
> 
> 3. If you don't like the results, click "Undo Last."
> 
> ⦿ Close window
> ○ Close window and dont show it again

CHERRY PICKING SEARCH TERMS

BACKGROUND OF THE INVENTION

1. Field of the Invention

The present invention relates to a method and system for conducting searches. More particularly, the present invention relates to a method and system for conducting a search for information by selecting search terms from amongst all the terms in the search results themselves.

2. Background of the Related Art

A keyword search of the Internet or other electronic media, using well designed all-purpose search engines such as Google (http://www.google.com), AOL (http://www.aol.com), or Yahoo (http://www.yahoo.com), often return thousands or even millions of hits. In part, this is because users enter only general search terms when they are looking for information.

When users do not anticipate the breadth of the search terms they submit, the search results or "hits" may be unfocused. The hits often span more content than is wanted. Only some of the selected content will be on topic for a particular user at a particular time. For example, a search for "file folder" may return hits about how computers are organized and lists of office supply stores; a search for "bass" returns hits about fish mixed with hits about musical instruments and a particular chain of shoe stores. When users skim such lists of hits, they may become aware that their search was too broad. They know that their results cover several topics and that some of them are not of interest.

Several methods exist for reducing hit lists when hit lists are heterogeneous. The user can construct and enter a new search string that includes words that discriminate between what they want at that particular time and what they do not want. For example, "file folder" might be changed to "file folder computer" and "bass" might be changed to "fish bass." Even though these phrases are not syntactical, both produce more focused search results.

Google puts a search-within-results option at the bottom of its pages. A user can reduce their hits by typing words that modify their original search. In addition, with most browsers, a user can highlight words that appear on a page of hits and drag them to the search box where they can be added to the original search string. For example, it might be efficient to add "muscular dystrophy" to the keyword, "heart," by highlighting the phrase when it appears in a hit list and dragging it to the search box. This strategy is slow but it prevents typographical errors.

At this time, there are at least two technologies that help users reduce and focus hit lists without entering new information into the search box. Google provides a link to "Similar pages" at or near the end of the listings on a page of hits generated by the Google search engine. Clicking on the "Similar pages" hyperlink produces a list of 30-35 hits that have content that is similar to the one hit that has been identified as relevant by the user.

However, the user does not have a choice of what words are used to identify hits that are defined as "similar" when they click on Google's "Similar pages" hyperlink. They do not even know for certain what word or words are used by Google to define "similar" hits.

Another technology for helping users select content is to put a list of specific sub-topics, sometimes called clusters or facets, on the page of search results. For example, Yahoo often puts suggested sub-topics at the top of a hit list if the search words submitted by a user are very general. Also, Vivisimo, Inc. (http://www.vivisiomo.com), Endeca, Inc. (www.endeca.com), Siderean, Inc (www.siderean.com) and many other search engines display lists of specific sub-topics as a basic design feature of their search technology. Their sub-topics are developed to meet business and design goals in a variety of situations. For example, LexisNexis Academic (www.lexisnexis.com) recently announced a new user interface, available in the summer of 2007, that will cluster news, legal and business information by subject, industry and company (www.econtentmag.com).

Sub-topics are defined by the algorithms of a particular search engine and their display is under the control of the search engine. The user can select a specific topic that is consistent with the search they intended to make if one of those displayed topics expresses what they are searching for. Doing so will reduce the hit count and focus their search.

Lists of sub-topics, (clusters) as they are shown by sites such as Yahoo, Vivisimo, Endeca and Siderean also have disadvantages. Users may not find a choice that is helpful. There is a practical limit to the number of sub-topics that can reasonably be displayed on a first page. Designers often truncate lists or direct users to other pages by putting a "more" hyperlink at the bottom of a short list of popular sub-topics in order to accommodate as many sub-topics as possible. The user then must take the time to page back and forth to see all their choices. Even when additional pages are used, all possible sub-topics can not be listed if the hit count is large or if the search results are heterogeneous. One of the ways search engines control the numbers of sub-topics they display to the display only the most popular ones.

U.S. Pat. No. 5,278,980 to Pedersen, et al, describes a "phrase oriented" search technique to help reduce and focus the hits returned from a keyword search. The technology identifies one search term in each hit (called a non-stop word) that is immediately adjacent to the keyword used to produce the list of hits. For any of the hits, the user can either select the adjacent search term and reduce the hit list or execute a particular function key to add the next most adjacent search term in that particular hit to the display. Pedersen et al. also include a variety of rules that account for situations where a keyword search starts with multiple words. The process of either selecting or "extending" a display in order to refine a search can be repeated multiple times.

Pedersen et al. "disambiguate" the meaning of the keywords and to avoid distracting the reader by cluttering the display . However, the fragmentation of the display and the interactions required of the user are not as easy to understand or to use as other techniques for reducing hit lists.

SUMMARY OF THE INVENTION

The present invention allows users to select words or other terms they see on an electronic medium and use them to search electronic data simply by clicking on the terms they want to use when they see them in an original display of information.

One characteristic of the present invention is that it does not rely on pre-defined categories of information that are produced by the search engines to reduce a list of search results. With this invention, the user picks terms directly from the text that is presented for the purpose of summarizing the content of the search results. The user is guided to reduce the quantity of information in a hit list by identifying and selecting search terms directly from the text that is presented to summarize the content. The user can reduce the size of the search by selecting search terms they recognize in the display of the text. The text may be a hit list or some other form of information, such as a news summary from an online news paper.

This invention has at least four advantages over and above the advantages of other technologies:

1.) More unique combinations of search terms are possible with these self-constructed search strings than with methods that pre-define sub-topics.

2.) Users know exactly what terms are being used to refine their search.

3.) Choices are made with a click of a mouse, so that typing on a keyboard is not required.

4.) No additional space is required to show the user how to focus the hit list and reduce the hit count. That is, repetitive prompts, such as a "Similar Pages" prompt at the end of each hit or a separate list of sub-topic choices, such as those shown by Visisimo or Endeca are not required. Saving display space is especially advantageous where display space is limited, such as when search results are displayed on a handheld device.

The number of search terms that can be applied to a search is limited only by the data itself, there is no technical or practical limit to the number of search terms that are available to the user. The user has much more opportunity to apply their own meaning and interpretation to a search than they have using other methods to reduce hits counts and focus information.

Selecting from choices that appear in context rather than selecting choices that appear in sub-topic lists makes search more transparent than other technologies. It gives users the latitude to select groups of hits based on their own knowledge of what they want from the content. Selecting in context, from existing sentences and descriptions, also preserves phrases and multi-part names that may be fragmented or overlooked when sub-topics are constructed by extracting only high-count words and listing them for users. Examples will be given in connection with the material in FIGS. 4 and 5.

There are many ways to visually indicate that terms are selectable. In the preferred embodiment of the current invention, selectable search terms are identified by a change in the shape of the cursor when the cursor hovers over selectable words in the text. Since a large number of terms are selectable from the brief descriptions that are shown, it is a design preference to indicate selectable words with only a change in the cursor's appearance and to avoid changing the appearance of the selectable terms by adding font or color changes, bolding or underlining. Multiple changes tend to clutter the appearance of the display when a large number of choices are available. Positioning techniques, timing features and other details of a cursor that is positioned over a word in a display have been described, for example, by Todd, et al, in U.S. Pat. No. 7,100,123.

Also, the visual features that indicate words can be search terms are always different than visual features that indicate a user can hyperlink to other information because the two technologies may appear side-by-side in the text Terms that can not be used to refine a search are not identified by distinctive features.

As an optional feature, the number of hits that will be selected can be shown to the user before a selection is made. The user will know how many hits they will be selecting in advance of selecting the search term. This is a useful feature because sometimes users choose one term over another because they prefer the smaller or larger number of hits selected by one rather than the other term. One way to display hit counts is through the use of anchor tags. The technology is described online, for example, by the W3C consortium at http://www.w3schools.com/tags/tag_a.asp.

Another optional feature is to allow the user to click an icon and reverse a search decision that has been made once they see its effects. One way of doing this is illustrated at www-.clusteredhits.com where, after reducing a hit list, a user can click an image that says "Undo Last."

The present invention allows for the selection of obvious, common sense terms such as adding "guitar" to a keyword search using "bass." The invention also allows for the selection of unusual and unlikely refinements such as adding a location, a style description, a brand, the year built or the ownership history to the search of "bass guitar." If lists are displayed using ranking algorithms, popular search terms tend to be at the top of the list.

The present invention has particular advantages for people searching for unique combinations of terms. They are not limited to popular or obvious pre-created sub-topics. For example, medical researchers and other scientists may find topics that rarely occur in databases and develop new areas of exploration. This new technology encourages serendipitous discovery in all fields of knowledge.

Search strings are self-constructed. Users work from their own experience and choose only the best terms from their own point of view. Users are not limited to search terms that are identified by someone else or pre-selected automatically by computer algorithms. This flexibility allows for more combinations of search terms than other technique. Users pick the terms that meet their own interests. For ease of description, this very flexible process is sometimes called cherry picking. The user is able to reduce the hit list many times and in many ways to produce an individualized, useful sub-list of hits.

These and other objects of the invention, as well as many intended advantages thereof, will become more readily apparent when reference is made to the following description, taken in conjunction with the accompanying drawings.

BRIEF DESCRIPTION OF THE FIGURES

FIG. 4 shows four contiguous hits that were displayed when the words "business intelligence" were entered as keywords on a smaller, special purpose search site and then filtered to display only non-fiction hits.

FIG. 5 shows part of a newspaper page in accordance with the invention.

FIG. 6 shows instructions displayed to users.

DETAILED DESCRIPTION OF THE PREFERRED EMBODIMENTS

In describing the preferred embodiments of the invention, specific terminology will be used for the sake of clarity. However, the invention is not intended to be limited to the specific terms used. It is understood that each specific term includes all technical equivalents that operate in a similar manner to accomplish a similar purpose. It is also understood that even though Internet examples are generally used in this description to illustrate the invention, the same technology applies to intranets and other non-public electronic search environments. The same technology applies to a self-contained electronic device where the communication link is between the display portion of the device and the processing portion of the device. Also, the technology can be applied as the sole method of selecting search terms or it can be used in combination with other methods of selecting search terms.

The following definitions are used to illustrate the invention and to facilitate description of the invention, but are not intended to limit the scope of the invention or the meaning of the claims. Other language could be used. A "term" refers to any symbol, image or word that conveys information. A "stop word" is any small and/or frequently occurring word that is not used as a search word, such as "and" and "the." A "search string" is one or more terms used to conduct a specific search.

The system and method of the present invention is implemented by computer software that permits the accessing of data from an electronic information source. The software and the information in accordance with the invention may be within a single, free-standing computer or it may be in a central computer networked to a group of other computers or other electronic devices. The information may be stored on a computer hard drive, on a CD ROM disk or on any other appropriate data storage device.

Figure 1:
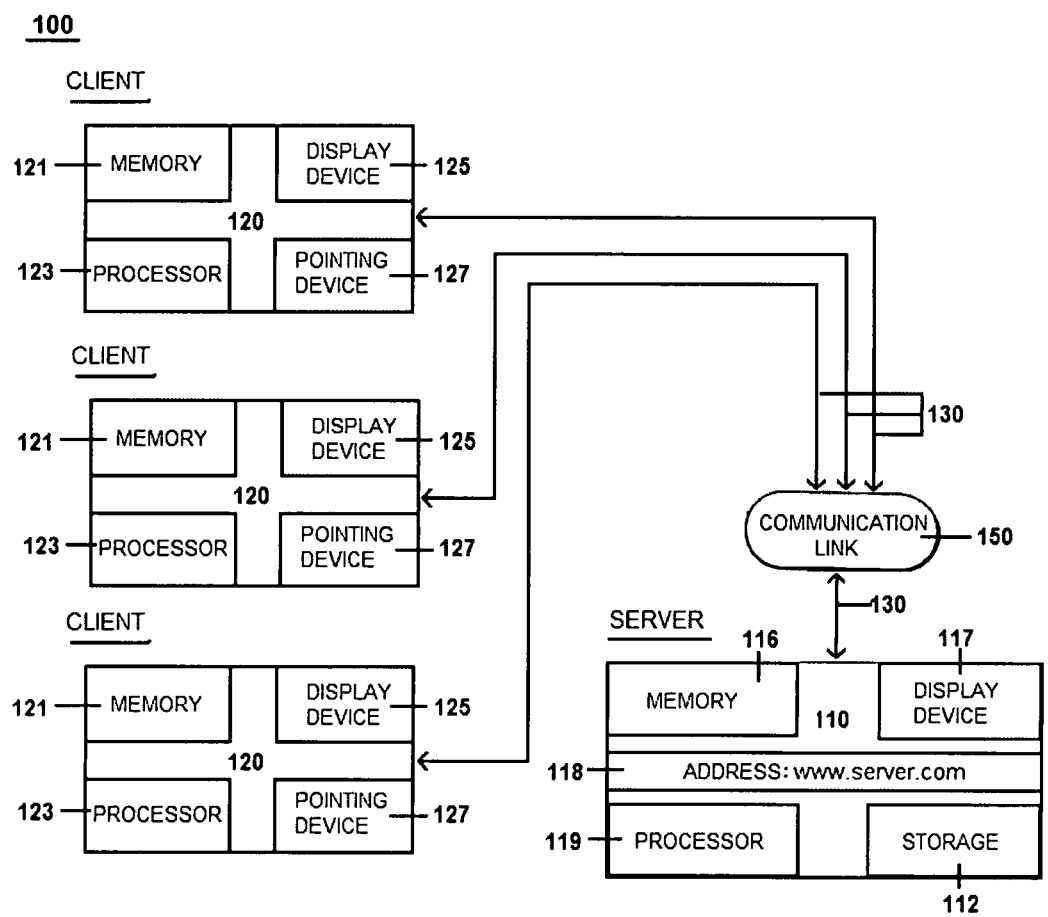
FIG. 1 shows a general configuration of computer hardware and software used in accordance with the present invention.

FIG. 1 shows the overall implementation of the invention. The system 100 preferably is implemented as a computer network having a plurality of client computers 120 networked to one or more remotely located servers 110 by a communication link 150 and bidirectional communication lines 130. The client computers 120 have a memory 121, processing capacity 123, a display device 125 and a pointing device 127. The server(s) 110 have a storage capacity 112, memory 116 and processing capability 119. As a practical matter, the servers 110 also have a display device 117 and a keyboard (not shown). The communication link 150 is preferably the Internet, the display devices 125, 117 may be monitors or the like, and the pointing device 127 may be a mouse. The information that is to be searched can be stored in the server 110 or can be information that is available from other locations.

The communication link 150 and the communication lines 130 provide two way communication between the clients 120 and the server 110. The link 150 is established when a client 120 accesses the server at its electronic address 118. This is done, for example, by entering the Internet address of the server 118 using a Web browser. Memory in the server 116 is optionally allocated so that the server 110 may retain the status of search requests generated by individual computers 120 during any individual search session.

Figure 2:
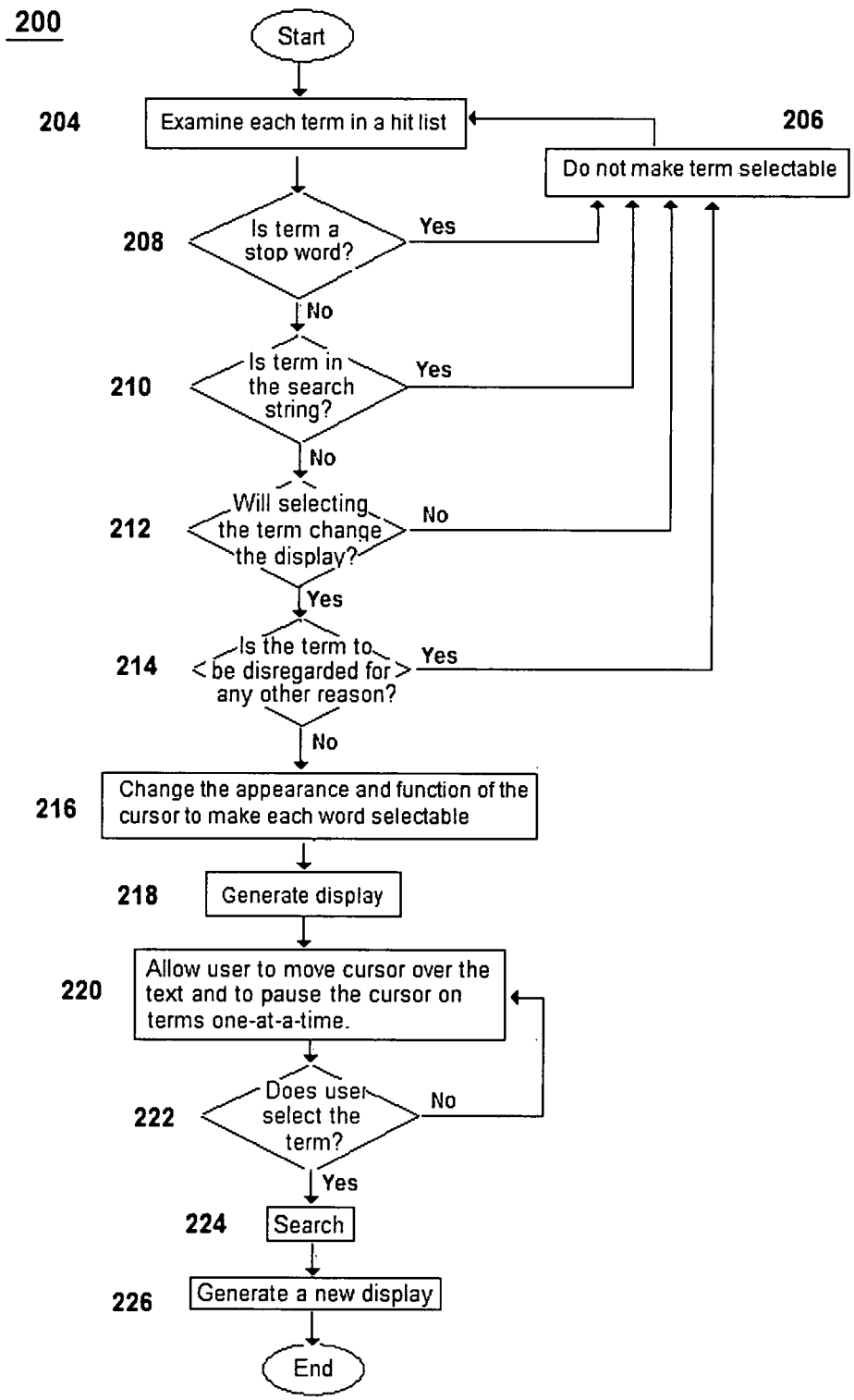
FIG. 2 is a flow chart showing the decision rules for implementing the invention.

FIG. 2 is a flow chart depicting a preferred operation of the system in accordance with the invention. The user has entered a keyword search or submitted a query by another means from the client 120. Information is transmitted to the server 110. The server conducts a search and identifies the information, preferably in the form of a list of hits. At least part of the list is transmitted to the client 120.

The system starts at step 202 in FIG. 2. At step 204, each term generated from the search is examined. The server 110 preferably examines each term in turn and determines whether or not each term is a selectable search term based on four decisions, steps 208-214 in FIG. 2.

If the word is a stop word (Yes at step 208), it is not selectable. One way to make this determination is to compare all terms in the text of the hit list to a list of stop words maintained for that purpose.

If the term is not a stop word (No at step 208) the term is then examined to see if the term is already in the current search string. If it is in the current search string (Yes at step 210), then it is not selectable. This decision is made to avoid search redundancy. If a term has already been used in a search, there is no reason to search on it again.

If the term is not in the search string (No at step 210), the term is examined to see if searching on it will have an effect on the hit list that is displayed, step 212. One way to make this determination is to generate hit counts for each term that is not a stop word and compare the hit count of the target term with the total hit count of the current search string. If they are the same, the term will not be designated selectable (No at step 212) because searching with it will have no effect of the outcome of the search.

If the term will have an effect on the hit list (Yes at step 212), the term is examined to see if it should be disregarded for any other reason. As an example, in the preferred embodiment, words are disregarded if they change the hit list by only a very small number of hits. For instance, if the current hit list consists of 500,001 or more terms and if searching on a specific term will reduce the hit list by 100 or fewer hits, a Yes decision is made at 214. Setting the lower search limit in this way allows search companies to prevent users from choosing terms that make very little difference in the outcome of their search. It also gives search companies some control over the volume of search activity on their servers. Another example of a situation-specific reason for not making terms selectable (Yes at 214) is shown in FIG. 5. If a newspaper wants to separate news content from editorial opinion and encourage the selection of the former, the invention can disregard adjectives and adverbs that appear in an online searchable newspaper.

If the decisions at steps 208, 210 or 214 are Yes or if the decision at step 212 is No, the term is not made selectable, step 206, and another word is examined beginning at 204. The order of executing steps 208-214 may be changed to accommodate efficient searching. For example, all stop words may be identified and set aside, step 208, before execution of steps 210-214

If the term is not disregarded for any other reason (No at step 214), the server 110 marks the term to be a selectable term. The function and the appearance of the cursor is changed so the term is selectable and so that the user can tell that it is selectable 216. In the current implementation, the shape of the cursor is changed from a straight line to an icon of a hand with a pointing index finger.

At step 218, a display is generated on the client's display device 125. The user can move the cursor over the text and pause on the terms one-at-a-time 220. If a selectable term is selected (Yes at step 222), the selected term is added to the search string and the search is updated to reflect the additional term, step 224. This is preferably done by having the server computer 110 search the hit list using the additional term that was selected. The number of hits is computed and a new search results page is sent to the client computer 120, and step 226. The process can be repeated from Start, step 202.

Figure 3:
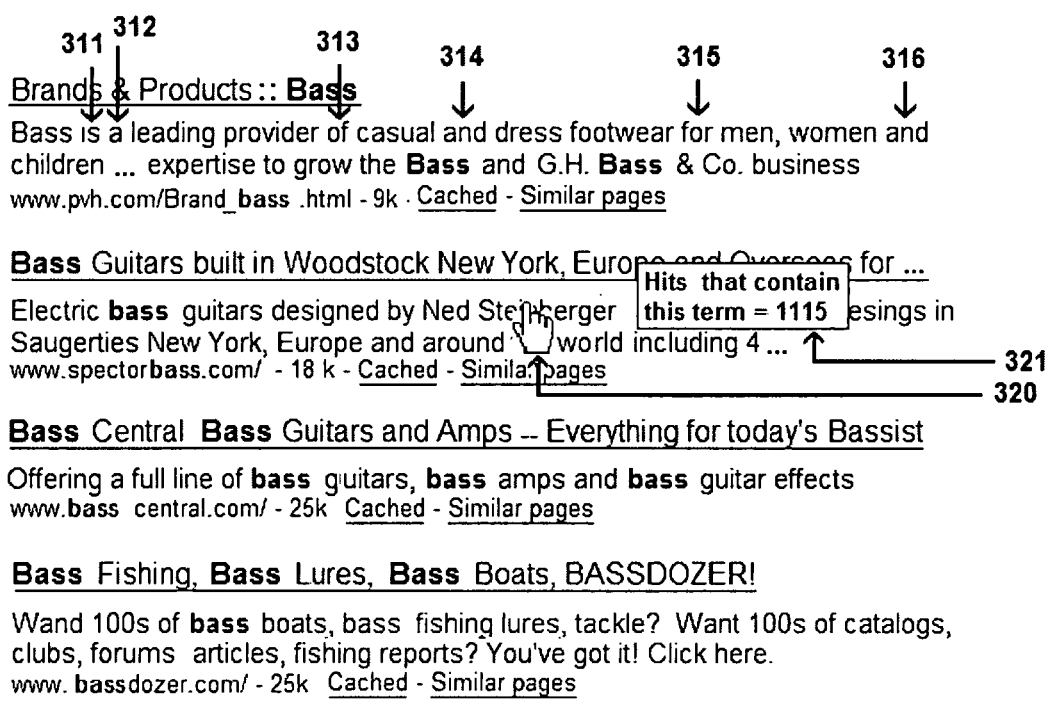
FIG. 3 shows four contiguous hits displayed when the word, "bass" was used as a keyword to search a large, general purpose search site.

FIGS. 3-6 further illustrate the invention. In FIG. 3, four hits from a hit list are displayed. They were generated by searching a large, general purpose Internet search engine using the keyword "bass." In this example, approximately 140 Million hits were found. The four hits shown in the figure are typical. Stop words occur in every hit that is shown. The stop words are identified in the first full line of the first hit in FIG. 3 as elements 311-316. The remaining words in that line—i.e., leading, provider, casual, dress, footwear, men, women, children—are selectable search terms with the exception of the word "bass." "Bass" is already a search term and is disqualified as a new search term according to the decision rule at step 210 of FIG. 2. As further illustrated in FIG. 3, the user has placed the cursor over the word, "Steinberger" 320. The shape of the cursor has been changed but the word has not been underlined, indicating the term is a selectable term. The anchor tag 321 indicates that there are 1,115 hits that contain that term in the currently selected set of 140 Million hits.

Hit lists ordinarily display only a small amount of text about each hit. However, the brief descriptions are sufficient information for the user to make decisions about how to proceed. For example, the user who enters "bass" as a search term on a general purpose search engine, FIG. 3, learns that there are a large number of hits about bass fish, bass shoes, and bass guitars. With this invention, the user can click on "guitar" and consolidate the list to a few million hits. The user also learns from the text that there are names of people and places and technical information associated with bass guitars and that those terms can be used to reduce the set of hits. For example, as illustrated, the user can select "Steinberger" 320. The user will know in advance that "Steinberger," gives them access to 1,115 hits that contain the search words, "bass" and "Steinberger."

FIG. 4 shows another example of information generated as a list of hits. It comes from a specialized database listing about 300,000 library books. The hits show book titles and sub-titles, authors, publication dates and library call numbers. The site also provides sub-topic lists that can reduce the number of hits generated from keyword searches. The four hits in the figure were generated by searching on the keywords, "business intelligence" and then selecting "Non-fiction" as a sub-topic to focus the list of hits. Six-hundred-fourteen hits were found. The four hits that are shown in FIG. 4 are typical of the whole list.

These four hits from the library search show selectable words that can be used to reduce the search further if the user wants to focus the hit list and have fewer hits than the current count of 614. One search term, "Trade" is shown proximate to the cursor 420. The anchor tag, 421, indicates that there will be 58 hits if the user clicks on "trade." Several other available search terms that could be applied to reduce the 614 hits in the example, are shown at 431-437. They include: American, cultural, people, value, global, work, and growth.

It is important to recognize that users will not ordinarily think to enter most of the words that are identified as selectable search terms. Users benefit from seeing selectable search terms such as "people" 433, "global" 435, and "growth" 437 displayed in the hit list. Users think of how to narrow their search when they see search terms displayed.

Also, seeing terms in context often provides more meaning than seeing lists of terms that have been extracted and put in a separate list. For example, in FIG. 4, the selectable term, "people" 433 appears in two places. It is used in the second hit in the context of "people skills for global business" and in the fourth hit in the context of "people from other cultures." These two phrases give the user subtle information about what kinds of information they will probably see if they add the term, "people" to their search. If the user puts the cursor over "people" and learns that there are only a few hits out of 614 containing the word "people," they will probably conclude that each of the hits are likely to be about people in groups, not people by name. If what they are looking for is people by name, the user will probably select some other term. Perhaps farther down the list, they will see the word, "executives" or "CEOs" and choose one of those terms hoping they will find people by name, if that is their goal. Seeing terms in the context of the original text allows users to include word tense, word position, word relationships and other subtle meanings of phrase and sentence structure in their decisions. Context gives more information about the author's use of a term than lists of sub-topics that are taken out of context and located separately on the page as sub-topic choices.

The present invention can be used by itself as illustrated in FIG. 3 or with sub-topics, as illustrated in FIG. 4. This invention fills a gap in search technology that cannot be filled by existing technologies. This invention allows a user to find and select any term that is selectable, no matter how often or how seldom it appears. That includes the ability to find unusual and obscure search terms that, because of space limitations, will not be placed in a list of sub-topics. Users benefit from being able to click on any selectable term when they see it in the context of the hit list and conduct a search that includes that term.

Taken together, the examples in FIG. 3 and FIG. 4 also illustrate that this invention can be successfully applied on sites that give only a small amount of information about each hit in a display of hits. The user can generate meaningful search terms from brief descriptions no matter how large or small the data set.

FIG. 5 illustrates the operation of the invention on web sites that are not provided primarily as search sites. In FIG. 5, part of a page from an online newspaper is shown. Selectable search terms are identified in news copy just as they are on the search sites shown in FIGS. 3 and 4. One such search term, "White," is shown in FIG. 5 at 520. An anchor tag 521 shows that the hit count for "White," will be 47.

In this example of news information, as a design choice of the newspaper, terms that are not selectable have been expanded according to step 214 in FIG. 2 to include adjectives and adverbs as shown at 530 and 532. Excluding adjectives and adverbs tends to promotes the selection of news and exclude the selection of editorial comment.

When a site is not set up as a search site, the scope of the search needs to be defined. In the example shown, it may be an amount of time such as the previous 24 hour day, the past week, the past month or some other amount of time. Other limits, such as certain sections of the paper may also be specified.

The ability to preserve phrases and multi-part names is one of the features of this invention. Its value becomes apparent when news copy is being searched in FIG. 5. For example, selecting "White" 520 always selects the phrase, "White House." Also, as a result of the decision rule at step 212 of FIG. 2, if "House" does not appear in any other context, that is, if White and House have the same hit count. "House" will be changed into a non-selectable word, step 212. The phrases "war strategy" 540, "Golf Coast" 542, and "Consumer Electronics Show" 544, and the names "Saddam Hussein" 546 and "David H. Petraeus" 548 will also be preserved throughout the search. This feature of the current invention provides much more access to data in context than other technologies.

FIG. 6 shows directions that can be presented to users who are seeing this new technology for the first time. Directions will appear in a separate, smaller browser window the first time a user passes their cursor over a selectable word. A user can easily turn it off.

The foregoing description and drawings should be considered as illustrative only of the principles of the invention. The invention may be configured in a variety of ways and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

I claim:

1. A method of searching an electronic information source with a system having a display device, an input device and a processor, the method comprising:
receiving at the processor, first search results of a first search of the electronic information source, the first search results including a plurality of terms that are selected from the electronic information source;
analyzing at the processor, each of the plurality of terms in the first search results to identify a plurality of selectable terms amongst the plurality of terms in the first search results that are distinct from a plurality of non-selectable terms amongst the plurality of terms in the first search results, wherein each of the plurality of selectable terms is selectable by a user and each of the plurality of non-selectable terms in the first search results are not selectable by the user;
displaying a plurality of the first search results of the first search on the display device, whereby the identified plurality of selectable terms in the first search results are distinguished on the display from the plurality of non-selectable terms in the first search results;
enabling the user to choose, using the input device, an additional search term by selecting one of the identified plurality of selectable terms from the first search results displayed on the display device;
conducting a second search at the processor using the selected search term to search the first search results; and,
displaying on the display device, a plurality of second search results from the second search.

2. The method of claim 1, wherein the selected search term is within the first display of search results.

3. The method of claim 1, wherein the selectable terms are based on the information obtained from the first search.

4. A method for searching on a system having a display device, an input device and a processor, the method comprising:
conducting by the processor a first search based on a first search term entered on the display device to identify a plurality of first search results, each of the first search results having a plurality of terms;
analyzing by the processor, each of the plurality of terms in each of the first search results and identifying a plurality of selectable search terms amongst the plurality of terms in the first search results that are distinct from a plurality of non-selectable terms amongst the plurality of terms in the first search results, wherein each of the plurality of selectable terms is selectable by a user and each of the plurality of non-selectable terms in the first search results are not selectable by the user;
enabling the user to select one of the identified plurality of selectable search terms from the first search results using the input device to define an additional search term; and,
conducting by the processor a second search using the additional search term to search the first search results.

5. The method of claim 4, wherein the plurality of selectable search terms are not identified to the user as being selectable prior to the step of conducting a first search.

6. The method of claim 4, wherein the search result comprises information that can be used in the search based on the selected search term.

7. The method of claim 4, wherein the search result terms comprise information from an Internet site identified by the search result.

8. The method of claim 4, further comprising displaying a plurality of the search results as a list.

9. The method of claim 4, further comprising displaying a plurality of the search results, wherein the selectable search terms are differentiated from the non-selectable search terms.

10. The method of claim 4, further comprising a cursor and a selectable search term that is differentiated by changing the appearance of the cursor when the cursor is positioned over the selectable search term.

11. The method of claim 4, wherein the selectable search term does not include search result terms that comprise a stop word.

12. The method of claim 4, wherein the selectable search term does not include search result terms that are part of a prior search query.

13. The method of claim 4, wherein the selectable search term does not include search result terms that are not included in a substantial number of the plurality of search results.

14. The method of claim 4, wherein the search result terms comprise a plurality of words and the selectable search term comprises one of the plurality of words.

15. The method of claim 4, wherein the search terms are displayed as part of a respective search result.

16. A method of searching the Internet on an Internet site operated by a processor and having a user interface for searching for online information from a user terminal having a display device and a pointing device displayed on the display device, the method comprising:
conducting by the user interface a search based on an original search term to identify a plurality of first search results;
displaying on the display device a plurality of the first search results, wherein each of the first search results has a link identifying a respective Internet site containing information, the displayed first search result further having terms associated with the information at the respective Internet site, the terms being positioned on the display to be associated with the link;
analyzing by the processor the plurality of first search result terms and identifying a plurality of selectable search terms amongst the search result terms that are distinct from a plurality of non-selectable search terms amongst the search result terms, wherein each of the plurality of selectable search terms is selectable by a user and each of the non-selectable search terms is not selectable by the user;
enabling the user to pass the pointing device over the search result terms to identify the selectable search terms from the first search result terms;
enabling the user to select with the pointing device any one of the selectable search terms from the first search result terms; and,
conducting by the processor a search based on the original search term and a selected search term, wherein the original search term is different than the selected search term.

17. The method of claim 16, wherein the step of enabling a user to pass a pointing device over the search result terms to identify the selectable search terms comprises modifying the appearance of the pointing device when the pointing device is positioned over one of the selectable search terms.

18. A system with access to electronic information, the system having a user interface for searching for online information from a user terminal having a display device and a pointing device displayed on the display device, the system comprising:
means for analyzing each of a plurality of first search results obtained from a first search of a first search term and identifying amongst the plurality of first search results a plurality of selectable search terms that are distinct from a plurality of non-selectable terms, wherein each of the plurality of selectable search terms is selectable by a user and each of the plurality of non-selectable terms is not selectable by a user;

means for displaying at the display device the first search results obtained from the search of the first search term, each of the first search results having the plurality of selectable search terms and the plurality of non-selectable terms identified by the means for analyzing;

means for enabling a user to select one of the plurality of selectable search terms from among the list of first search results, the selected search term different than the first search term; and means for conducting a second search using the selected search term and the first search term.

19. A system for searching comprising:

a processor conducting a first search based on an original search term, analyzing each term of a plurality of search results from the first search, and identifying a plurality of selectable terms from amongst the plurality of search results that are distinct from a plurality of non-selectable terms from amongst the plurality of search results, wherein each of the plurality of selectable search terms is selectable by a user and each of the plurality of non-selectable terms is not selectable by a user;

a display device configured to display the search results from the first search, the plurality of selectable terms, and the plurality of non-selectable terms; and, an input device configured to select one of the plurality of selectable terms from among the list of search results displayed on said display device;

wherein the processor conducts a second search based on the original search term and the selected search term, and the selected search term is different than the original search term.

20. The system of claim 19, wherein the selectable terms comprise information about a respective search result.

21. The system of claim 19, wherein the selectable terms do not include terms that are not included in a substantial number of the plurality of search results.

22. The method of claim 1, further comprising displaying on the display device the results of the search conducted using the selected term.

23. The method of claim 4, further comprising displaying on the display device the results of the second search.

24. The method of claim 16, further comprising displaying on the display device the results of the search conducted using the selected term.

25. The method of claim 1, further comprising enabling the user to identify, using the input device, at least one of the plurality of selectable terms.

26. The method of claim 25, further comprising displaying for the identified selectable term, an approximate number of hits that would be obtained if the identified selectable term was selected by the user.

27. The method of claim 25, wherein the identified term is identified by using the input device to place a cursor over one of the plurality of selectable terms.

28. The method of claim 1, further comprising displaying for at least one of the plurality of selectable terms, an approximate number of hits that would be obtained if the at least one selectable term was selected by the user.

29. The method of claim 16, further comprising displaying an approximate number of hits that would be obtained for a selectable search term identified by the step of enabling the user to pass a pointing device over the search result terms to identify the selectable search terms.

30. The method of claim 1, wherein said first search term comprises a plurality of search terms.

31. A method of searching an information source with a system having a display device, an input device and a processor, the method comprising:

receiving at the processor, a plurality of terms located as a result of a first search of information based on at least one first search term;

displaying on the display device, the plurality of terms located as a result of the first search, the displayed plurality of terms having a plurality of selectable terms and a plurality of non-selectable terms, wherein each of the selectable terms is a single individual term that is selectable by a user and each of the non-selectable terms are not selectable by the user and wherein the plurality of selectable terms are displayed amongst the plurality of non-selectable terms as part of the plurality of located terms;

enabling the user to identify using the input device, a second search term different than the first search term by selecting one of the plurality of selectable terms displayed on the display device as a result of the first search;

conducting a second search at the processor, based on the first search term and the second search term; and, displaying on the display device, results of the second search.

32. The method of claim 31, further comprising the step of analyzing each of the plurality of terms at the processor, and determining whether or not each of the analyzed plurality of terms is selectable.

33. The method of claim 1, wherein said step of analyzing further comprises identifying the plurality of non-selectable terms amongst the plurality of terms in the first search results.

34. The method of claim 4, wherein said step of analyzing further comprises identifying the plurality of non-selectable terms amongst the plurality of terms in the first search results.

35. The method of claim 16, wherein said step of analyzing further comprises identifying the plurality of non-selectable terms amongst the plurality of terms in the first search results.

36. The system of claim 18, wherein said means for analyzing further comprises identifying the plurality of non-selectable terms amongst the plurality of terms in the first search results.

37. The system of claim 19, wherein said processor is further configured to identify the plurality of non-selectable terms amongst the plurality of terms in the first search.

* * * * *